May 13, 1924.  W. E. ROBERTSON  1,493,897
WHEEL
Filed Dec. 2, 1919    4 Sheets-Sheet 1

May 13, 1924.

W. E. ROBERTSON

WHEEL

Filed Dec. 2, 1919 4 Sheets-Sheet 2

Witness:
Jas E Hutchinson

Inventor:
Walter E. Robertson,
By Milans & Milans
Attorneys

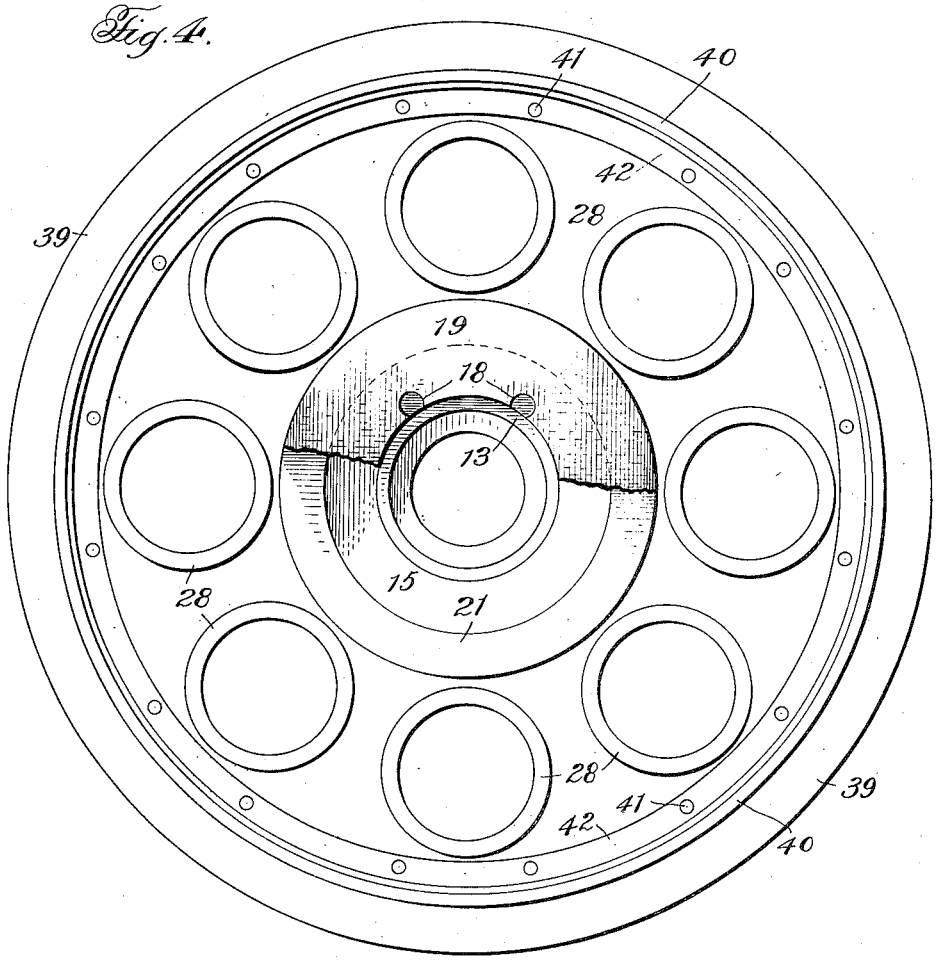
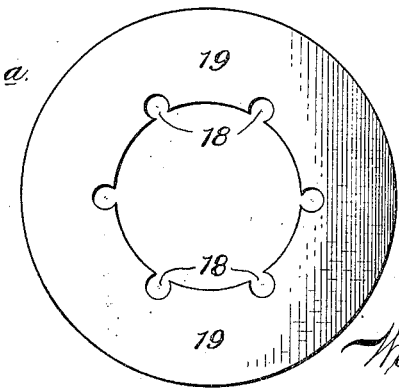

May 13, 1924.
W. E. ROBERTSON
WHEEL
Filed Dec. 2, 1919
1,493,897
4 Sheets-Sheet 4
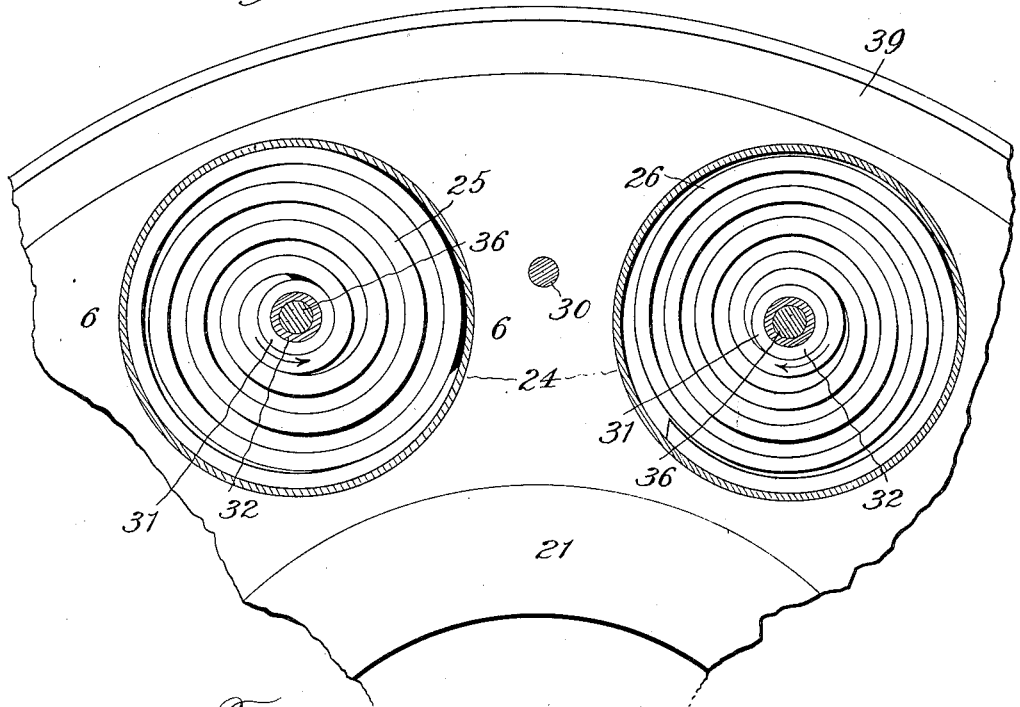
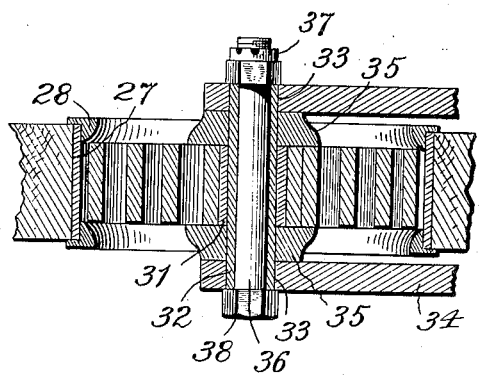
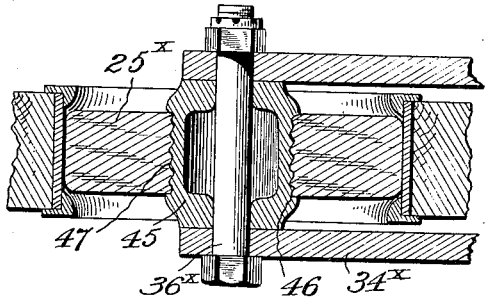

Patented May 13, 1924.

1,493,897

UNITED STATES PATENT OFFICE.

WALTER E. ROBERTSON, OF CHICAGO, ILLINOIS.

WHEEL.

Application filed December 2, 1919. Serial No. 341,854.

*To all whom it may concern:*

Be it known that I, WALTER E. ROBERTSON, citizen of the United States, residing at Chicago, in the county of Cook and State of Illinois, have invented certain new and useful Improvements in Wheels, of which the following is a specification, reference being had therein to the accompanying drawing.

This invention relates to improvements in wheels, and has for its primary object the provision of a wheel which will possess, so far as possible, all the advantages of a pneumatic-tired wheel, while overcoming many disadvantages thereof and presenting features of improvement thereover.

It has long been the effort, particularly since the modern development of the automobile art, to provide a wheel that would satisfactorily meet the universal need for a vehicle tire that would relieve the user of the annoyance and embarrassment including the very great expense attending the employment of pneumatic tires. Cushion tires, combination spring tires, rubber filled tires, spring wheels, combination wheels and tires embodying both cushion and pneumatic or cushion and spring elements have been resorted to in countless number. However, so far as I am aware, and I have been actively experimenting for a substantial period in the art, the latter, up to the time of my conception, has remained devoid of a wheel capable of functioning to attain the results absolutely necessary to be accomplished in the intended field of motor vehicle service.

The object of the invention is to provide an improved wheel that will possess all those characteristics enabling the same to abundantly care for the vertical, torsional, tangential, lateral, and radial shocks and strains to which wheels are constantly, and in a more or less confused or opposing manner, subjected. Heretofore, it has seemed to be the belief that in spring wheels the rim or tread portion should have a yielding play with reference to the remainder of the wheel, but that no lateral movement should be permitted. I have discovered that there can be no hope of supplanting a pneumatic tire by a resilient wheel unless the tread or rim portion is permitted to yield and be cushioned under lateral shocks imparted to the wheel; and also that the convulsive vibrations ordinarily flowing from radial impacts and thrusts should be resisted, or it might be said, absorbed, by means supplemental to the springs interposed between the rim portion and the body of the wheel.

With the foregoing considerations in mind, my present invention may be said to reside in the provision of a resilient or spring wheel wherein the main yieldable or adjustable shock-absorbing and cushioning elements are located near the rim portion of the wheel, to the end that the wheel bearing and body (taking the place of the ordinary spokes) are relatively bodily immovable with respect to the movable nature (bodily displacement) of the rim. Between the wheel bearing and body, however, a shock-absorbing or cushioning means is provided, which will also assist in maintaining a concentric relation between the yieldable or movable rim, intermediate body portion and bearing, the relation of these parts being such that the interposed yieldable members between the rim and the body will permit lateral give and cushioning of the rim relative to the remainder of the wheel. As a result of the foregoing combination, the wheel in practice, will enable the body of the car or vehicle with its supporting axles and bearings to traverse smoothly through a plane approximately paralleling the road or street surface, and in what might be said to be, and which in practice presents, the actual sensation of a floating condition within the self-adjusting resilient wheel structure, augmented to a pleasing degree by the utter relief of lateral jar or vibration from lateral blows or swaying tendencies which would ordinarily tend to crystallize the axle or bearing members and also cause the skidding of the car or vehicle.

A serious objection to spring wheel structures heretofore proposed is the attending rubbing relations,—and consequent frictional actions,—of associated elements, which would be subjected to constant wear and require constant lubrication, to say nothing of the disconcerting squeaks and other noises resulting from such actions.

A further object of the invention is the elimination and avoidance of rubbing or frictionally-resisting elements, to dispense with all lubrication and the expense thereof, and provide a frictionless, noiseless, non-lubricated resilient wheel.

In so far as the subject matter is common to the two cases, the present application is to be regarded as a continuation of my application, Serial No. 198,401, filed October 25, 1917.

The improved arrangements, details, and construction of parts will be apparent from the detail description hereinafter contained when read in connection with the accompanying drawings forming part hereof and wherein preferred embodiments of the same are illustrated.

In the drawings:

Figure 4 is a face view of the wheel with the outer plate removed;

Figure 1:
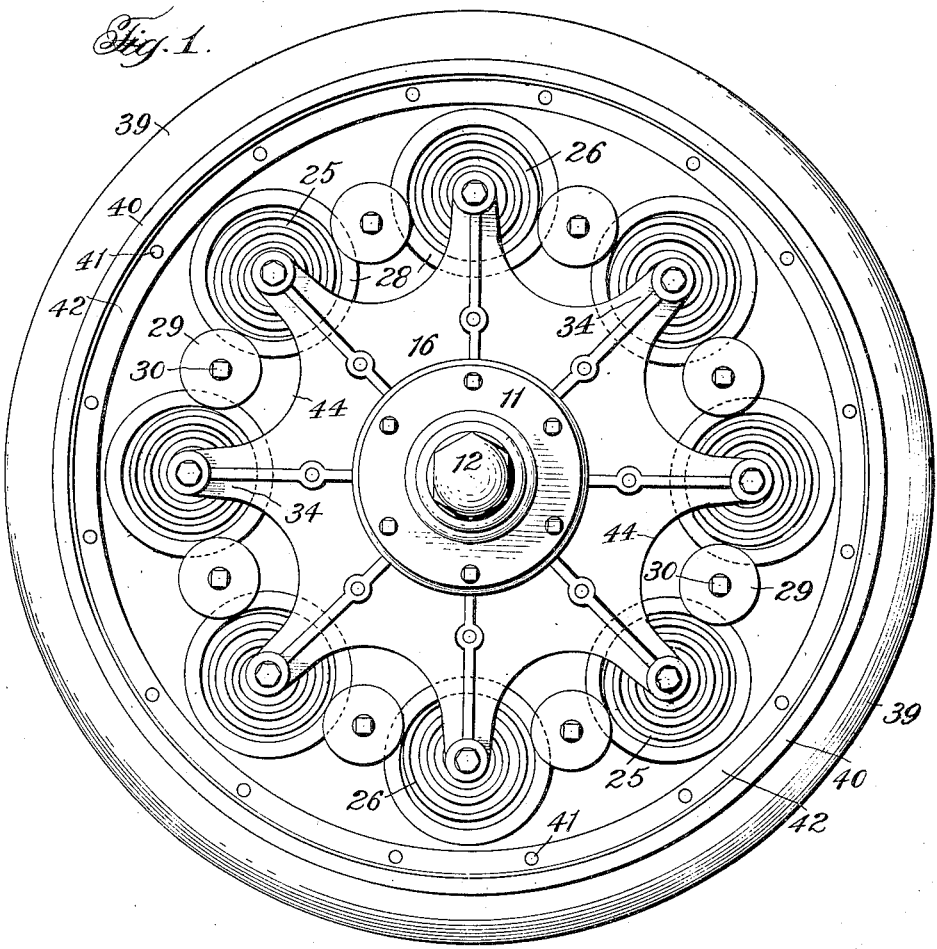
Figure 1 is an elevation of the wheel.

Fig. 4ᵃ is a detail view of one of the cushioning members;

Figure 5 is an enlarged sectional view showing a pair of the oppositely wound coiled springs;

Figure 6 is a sectional view through one of the springs indicated as on the line 6—6 of Fig. 1; and Figure 7 is a similar sectional view of a second embodiment of the invention.

Referring more specifically to the drawings wherein like reference letters designate the same parts in the series of views constituted by the first six figures, 8 represents the hub portion of the wheel carrying a brake drum 9, and within which hub the usual anti-friction bearings may be housed and disposed to cooperatively engage with the shaft or axle 10, these parts being shown merely in outline, or without exhaustive detail in view of the fact that they form no part of the present improvement. 11 is a disk adapted to cover the end of the bearings and to be itself closed by a hub cap 12.

Surrounding the hub 8 is a strong metal ring 13 spaced from the hub by an interiorly disposed flange or web 14. This ring 13 is circumferentially grooved or formed trough shaped to receive a shock-absorbing and cushioning element 15 formed and functioning as will be later pointed out.

16 represent the side or face plates of the wheel. They occupy a fixed position with reference to the hub and associated parts, being securely bolted in place as at 17.

Formed hollow to fit upon the flanges of the ring 13,—recesses 18 (Fig. 4ᵃ) being formed at the inner edges for the accommodation of the bolt heads or nuts 17,—and to occupy positions on the inner face of the plate 16 are cushioning members 19 of fiber, leather or equivalent material. These perform an important function as will also later appear.

A second ring, or what I will term a movable ring, the base of which is indicated at 20 and the outwardly disposed flanges at 21, occupies a normally concentric relation to the ring 13, the size of the opening 22 within this movable ring being such with respect to the diameter of the ring 13 that the rubber cushioning and shock-absorbing member 15 is forced within the movable ring in a compressed state and remains in a substantially compressed condition in all of its subsequent operations in order to continually exert a suspending as well as its resisting and centering functions.

Figure 3:
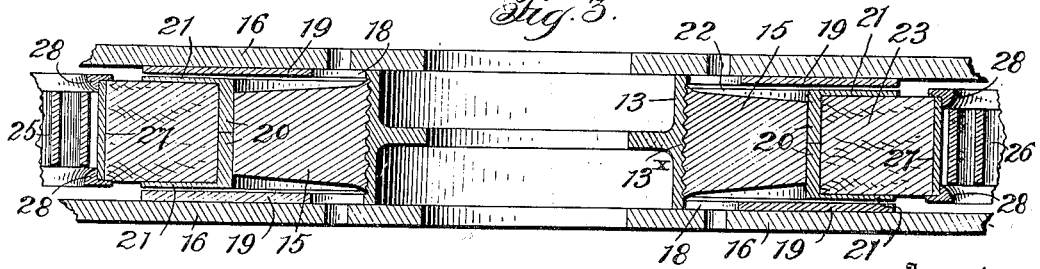
Figure 3 is an enlarged fragmentary section of the central portion of the wheel.
Figure 2:
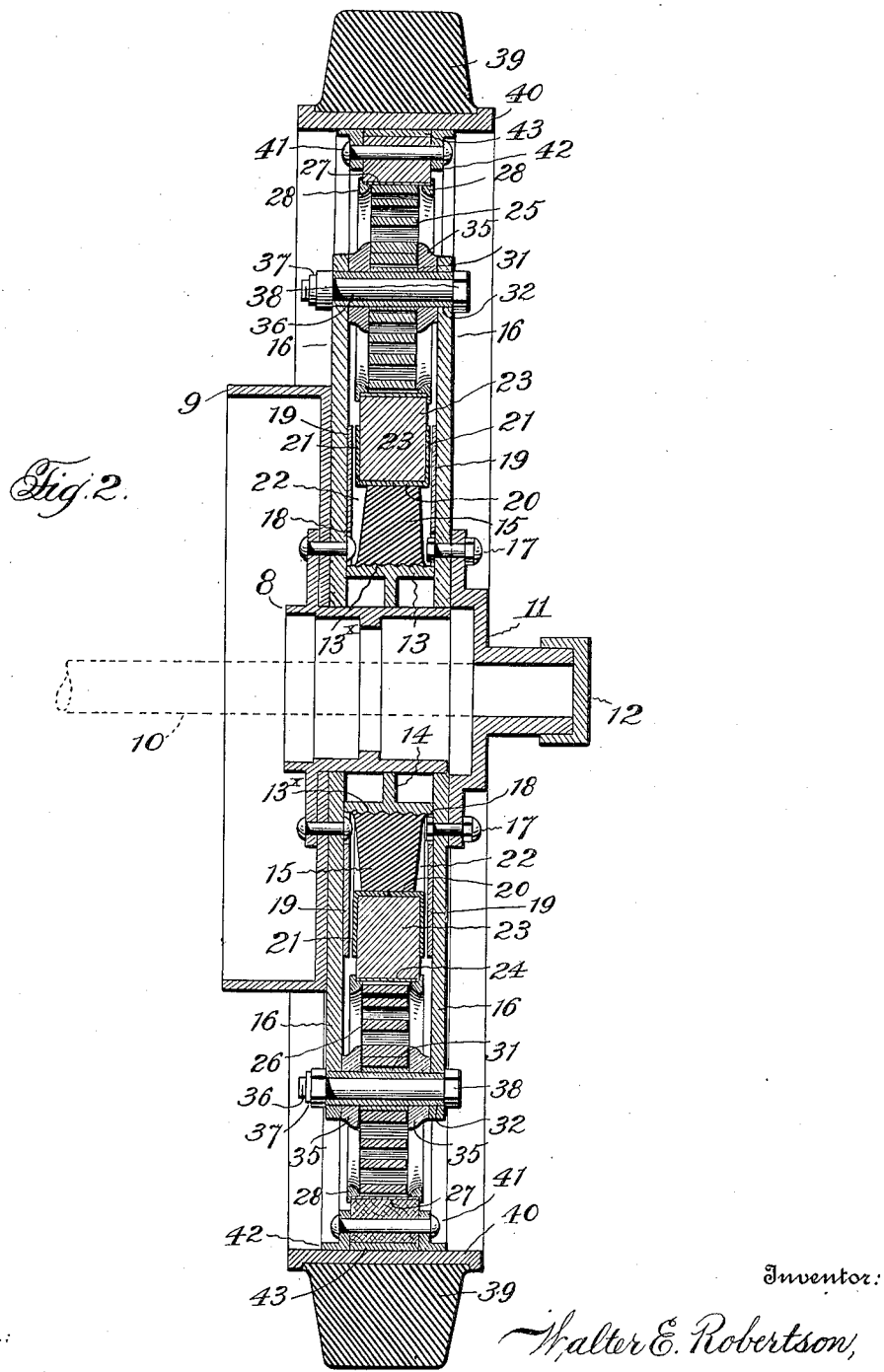
Figure 2 is a vertical sectional view.

The cushioning member 15 is preferably molded or vulcanized in position on the ring 13 and to more securely fasten these parts together against independent movement or play, the rubber inter-engages with a roughened, pointed or grooved periphery 13ˣ of the ring 13. It being the aim to reduce to the minimum all surface or frictional contact, the side walls of the cushioning member 15 are bevelled to occupy an outwardly converging relation as clearly shown in Figures 2 and 3 to afford ample room in the space 22 for the widening of the member 15 under added compressive forces without rubbing radially against the fiber cushioning members 19.

The movable ring member 20 is of a width substantially less than the distance between the opposite inner faces of the members 19 so that the ring 2 may not only be free to shift eccentrically to the ring 13 when forces are applied in a radial direction to compress the member 15, but they also shift laterally to relieve the springs to be now defined, to a predetermined extent, and to constitute a limit or stop to such lateral relief following an engagement of the flanges 21 of the movable ring with the fiber cushioning members 19. 23 represents what may be appropriately styled the body or disk element of the wheel, the same being conveniently formed of wood seated in and reinforced by the ring 20, although the same may obviously be made of metal, solid or structural, or of other suitable material. This body portion 23 is provided near the outer edge thereof with a series of pockets or recesses 24 preferably of substantially circular contour and of even number distributed equi-distant apart throughout the wheel so that the latter will be balanced throughout and the forces equally distributed throughout the entire outer portion of the wheel, it being apparent, as has doubtless already been appreciated, that the recesses or pockets to which allusion has just been made are intended for the reception of the main resilient elements of the wheel. These elements are designated by the numeral 25 and 26, they being the same in general character, but alternating as illustrated in Figure 5 to present their turns or convolutions as winding in reverse directions, or, speaking with reference to the lower halves of the springs, those of 25 winding from left to right, and those of 26 winding from right to left (see the arrows Figure 5). This alternate reversal of the winding of the coils or convolutions will effect a counter-acting relation between each adjacent pair of springs. The pockets may be interiorly grooved or otherwise flanged to provide seats 27 for the outermost convolutions of the springs, one suitable manner, that illustrated in the drawings, consisting of angle-irons 28 introduced from the opposite ends of the pockets to constitute inwardly directed flanges best seen in Fig. 6. The flanges 28 are retained against unintentional displacement or release by lock washers or disks 29 held in place by detachable nuts and bolts 30, the washers being of a size to have their opposite edges engage over the rings 28 and the bolts 30 passing through the body portion 23 at points intermediate of each pair of spring pockets 24. The size of the spring pockets 24 with relation to the size of the springs 25 when the latter are distended or expanded to their maximum, is such that to introduce the springs into the pockets they must be wound so tight or close that when expanded to seat firmly in the grooves of the pockets, there will be no danger of the coils of the spring either winding or unwinding to a degree that will unseat the springs or impair the operative relation thereof to the associated parts of the wheel. Of course it will be apparent that the springs are made of a material and strength far exceeding any requirements to satisfy normal and most any abnormal work or opposing forces to which the wheel may be subjected on any kind of street surface or road.

As in the instance of the rubber member 15, the installation of the springs 25 and 26,—and this is also true of the members 25$^x$ to be later described,—under the rather tightly wound or compressed state, will effect the continual exertion of these elements to expand and under the tendency, they function not only to cushion and absorb the shocks of the working parts, but also act to suspend or sustain in operative position the associated parts.

The inner turn or convolution of each spring receives and carries with a hugging fit a bearing member 31 which may be fastened to the spring but preferably not because the frictional hold in most instances would be quite sufficient. The bearing 31 is hollow (Fig. 6) and is sleeved upon but is not intended to play over a sleeve 32 passing therethrough and through aligned apertures 33 in the radiating arms 34 of the face plate 16, each plate having an arm corresponding to each pocket with the aperture of the arm axially aligned with the center of the pocket. Spacing members or collars 35 are placed between the bearings 31 and adjoining portions of the springs and the plate arms 34, the sleeves 33 also passing through the spacing members, and bolts 36 passing through the sleeves 33 provided with suitable lock nuts 37 and heads 38 bridge the opposite plate arms 34 and clamp the same together with the therebetween inserted parts including the innermost convolutions of the springs fixedly in place.

It is to be here observed that the width of the springs 25 with relation to the width of the space between the arms 24, and also that the width of the body member 23, with the parts immediately associated therewith, are all such that a lateral yield or cushioning of the structure within and relative to the side plates 16 may be had to an extent defined only by the cushioning engagement of the flanges 21 of the movable ring members 20 with the leather or similar cushioning members 19.

Surrounding the body 23 is a solid rubber or other suitable tire 39 attached to a rim 40 riveted or otherwise secured to the body 23 as at 41 through the medium of angle irons 42, said body, when of wood, being additionally strengthened by a metal band or hoop 43.

A notable feature of the plates 16 is that the cutaway portions thereof between the radially projecting spring-engaging arms 34 are curved as at 44 to conform to and of somewhat greater size than the spring pockets 24. The purpose of this construction is to facilitate the removal of the springs. By removing the nuts 37 of the bolts 36 and driving the bolts and sleeves through the arms 34 to release the latter, and if necessary, removing the lock washers 29, the plates 34 may be swung around from the position shown in Fig. 1 to a position with the cutaway portions 34 in substantial registration with the spring pockets 24, and the springs may then be removed from the pockets and through the cutaway portions 44. This will be of particular advantage in both assembling and repairing the wheel particularly in these instances where the plates are also connected in some way, but still permitted to be turned on the hub portion, as in extra heavy wheels.

In taking care of the lateral forces or strains, the springs 25 give in a lateral direction, enabled by a warping or twisting of the springs. It will be understood that this capability or quality of the springs may be effectively utilized in this manner because such springs, as previously observed are intentionally built of a size and strength to exceed every possible demand to be made of them, and because of the length of the spring material going to make up the convolutions and the relatively close winding of the same, the twisting or warping thereof at any one point is very slight, the lateral resisting and cushioning function being distributed throughout the length of the spring material. A great resisting and cushioning effect is obtained in the manner stated and this will be instantly realized when it is remembered that the twisting or warping of the spring material is acting through a curved line described by the arc or approximate circle occupied or formed by the convolutions or coils of the spring. In lieu of the metal springs 25 I may at times resort to a modified construction such as illustrated in Fig. 7 wherein a rubber cushion 25$^x$ is illustrated as taking the place of said spring 25. The rubber members 25$^x$ are molded or vulcanized to a hub 45 adapted to be clamped in fixed position between and bolted to the plate arms 34$^x$ as at 36$^x$. The hub member 45 is peripherally grooved as at 46 and provided with an irregular surface 47 to more securely hold the rubber member 25$^x$ in place against bodily movement relative to the hub member. In introducing the rubber members 25$^x$ into the spring pockets 24$^x$ they are highly compressed so as always to exert a self-acting force to retain the members in the pockets and to perform the other functions to which I have already alluded. Here, again, as in the instance of the springs 25 the associated parts are so proportioned that the cushioning members 25$^x$ will absorb and take care of the shocks and strains exerted laterally of the wheel.

From the foregoing description it will be clear that in the provision of the wheel illustrated in connection with such description, and wheels involving mechanically equivalent elements, I present a structure that, while eliminating friction between parts, will, as suggested in the fore part of the specification take care of or absorb, and correspondingly relieve the body of the vehicle of the vibration and jar ordinarily expected to flow from shocks and strains to which the wheel is subjected from vertical, torsional, tangential, lateral, or radial, and in fact any direction. The load is distributed remote from the center of the wheel and suspended within the springs with equal distribution and parallel suspension. The wheel meets the requirements of the law of gravitation, and it is apparent that should there be a changed point of application of force from the vertical, the wheel would be immediately, automatically adjustable to meet said changed point or force. It is the nature of the cushioning elements distributed around the rim to detour all shocks that may be encountered and neutralize, in conjunction with the cushion near the hub, the radial reactions. In the travel of a vehicle equipped with my wheels the force of momentum is important in that it causes all of the centers or points of suspension to traverse a horizontal plane, while permitting the rim to rise and restore itself to normal relation with other parts of the wheel in keeping with the obstructions encountered by the periphery of the wheel in a horizontal plane. This maintains traction at all times because of the combination of forces neutralizing the effects of impact and reaction. The cushion at the wheel center or hub helps care for the radial shocks, overcomes any disadvantage of confusion of spring elements when located as heretofore at this point, and acts to maintain the associated parts in concentric relation. Again, where springs are located at the center of the wheel instead of a cushion such as I have provided, forces applied tangentially of the rim tend to create a winding effect in the wheel which when released results in a choppy action in the wheel and ultimately to the body. Such an action I overcome.

By locating the springs as near as possible to the rim, or I may say nearer the rim than to the hub, a more effective action of the springs, both against radial and transverse shocks or blows, is attained. This flows from the fact that the leverage against the application of force decreases as the positioning of the springs approaches the periphery or rim of the wheel.

The relation of the tread portion of the wheel,—that is, the resiliently sustained outer part of the wheel,—to the inner relatively stationary part, is such that as the wheel travels, and the said tread portion changes from its concentric to an eccentric relation to the axis of the wheel, the tendency, because of the out-of-balance effect, is to roll and to that extent the traction of the wheel is reduced.

It is to be understood that whereas, throughout these specifications and drawings, especial reference has been made to the object of supplanting the pneumatic tire, said invention is nevertheless useful, and I contemplate its employment in wheels provided, if desired, with pneumatic tires instead of those of the solid or cushion type. Where both my improved wheel structure and pneumatic tires are used, the ultimate effect on the vehicle and occupant thereof will be a smoothness in riding hitherto impossible of accomplishment.

While I have herein disclosed a specific embodiment of the invention and one modification thereof, it will be apparent to persons skilled in the art to which the invention relates that the same is capable of embodiment in still other forms and devices without departing from the principle thereof.

Having thus described the invention, what I claim is:

1. A wheel of the character described, comprising a tread portion and a hub portion movable laterally relatively to each other, and cushioning means therebetween disposed around the wheel adjacent to the tread portion and adapted to exert cushioning function laterally as well as radially and circumferentially of the wheel, the relatively movable parts being normally separated from each other at the sides thereof to provide for freedom of lateral displacement and to avoid friction, and means for preventing excessive displacement comprising cushioning surfaces arranged to contact at the limit of lateral displacement of the relatively movable parts.

2. A wheel of the character described comprising a tread portion, a hub portion, cushioning means interposed therebetween and disposed around the wheel near the tread portion, and supplemental cushioning means comprising a rubber cushion between said first mentioned cushioning means and the hub, said supplemental cushioning means being completely spaced at its sides from its immediately associated parts to avoid surface friction therebetween.

3. A wheel of the character described comprising a tread portion, a hub portion, and cushioning means therebetween including a series of pockets in one of said parts disposed around the wheel, said pockets being open at the side to the outer side of the wheel, and spiral springs forced into and constantly held in place in said pockets in such a closely wound condition that any tendency of the springs to wind in operation cannot dislodge the same from the pockets.

4. A wheel of the character described, comprising a tread portion and a hub portion movable relatively to each other, and resilient connections therebetween including a body portion comprising a series of pockets disposed around the wheel near the tread portion, spiral springs in said pockets, a rubber cushion interposed between the body portion and the hub portion, the spiral springs and rubber cushion resisting while permitting lateral movement of the tread portion and associated parts, in combination with cushioning means at the limit of lateral yield of the same.

5. A wheel of the character described comprising a tread portion, a hub portion, and resilient connections therebetween including a body portion provided with transverse pockets, resilient members in said pockets, side plates extending from the hub portion and provided with arms secured axially of the resilient members, the arms of the respective plates being disposed opposite each other, and means for holding the resilient members in the pockets, said means comprising retaining rings having portions fitting into the pockets, plates arranged in pairs opposite each other at opposite sides of the body portion in the spaces between said arms, said plates having portions engaging the retaining rings, and transverse bolts and nuts detachably securing the pairs of plates together.

6. A wheel of the character described, comprising a tread portion, a hub portion, resilient connections therebetween including a body portion having a series of pockets disposed around the wheel near the tread portion, spiral springs in said pockets, and an annular rubber cushioning member interposed between the body portion and the hub portion, the tread being movable laterally and radially relative to the hub, and the relatively movable parts including the rubber cushioning member being completely separated at the sides from the immediately associated parts to provide for freedom of cushioning displacement laterally and to avoid friction, the spiral springs and rubber cushioning member resisting while permitting lateral movement of the tread portion.

7. A wheel of the character described, comprising a tread portion, a hub portion, resilient connections therebetween including a body portion having a series of pockets disposed around the wheel near the tread portion, spiral springs in said pockets, an annular rubber cushioning member interposed between the body portion and the hub portion, the tread being movable laterally and radially relative to the hub, and the relatively movable parts including the rubber cushioning member being completely separated at the sides from the immediately associated parts, to provide for freedom of cushioning displacement laterally and to avoid friction, the spiral springs and rubber cushioning member resisting while permitting lateral movement of the tread portion, and means for preventing excessive lateral displacement comprising cushioned surfaces arranged to contact at the limit of lateral displacement of the relatively movable parts.

In testimony whereof I hereunto affix my signature.

WALTER E. ROBERTSON.